US012731120B2

(12) United States Patent
Lal

(10) Patent No.: US 12,731,120 B2
(45) Date of Patent: Sep. 8, 2026

(54) SECURING PEER-TO-PEER TRANSFER OF COLLECTIBLE PERSONAL 3D DIGITAL ASSETS FOR SALE IN THE METAVERSE

(71) Applicant: Adeia Guides Inc., San Jose, CA (US)

(72) Inventor: Dhananjay Lal, Englewood, CO (US)

(73) Assignee: ADEIA GUIDES INC., San Jose, CA (US)

( * ) Notice: Subject to any disclaimer, the term of this patent is extended or adjusted under 35 U.S.C. 154(b) by 46 days.

(21) Appl. No.: 18/200,334

(22) Filed: May 22, 2023

(65) Prior Publication Data

US 2024/0394679 A1 Nov. 28, 2024

(51) Int. Cl.
*G06Q 20/12* (2012.01)
*G06Q 20/38* (2012.01)
*G06Q 20/40* (2012.01)

(52) U.S. Cl.
CPC ....... *G06Q 20/1235* (2013.01); *G06Q 20/389* (2013.01); *G06Q 20/401* (2013.01)

(58) Field of Classification Search
CPC . G06Q 20/1235; G06Q 20/389; G06Q 20/401
USPC ........................................................ 705/51
See application file for complete search history.

(56) References Cited

U.S. PATENT DOCUMENTS

2023/0045546 A1* 2/2023 Kim ...................... H04L 9/3265
2023/0108610 A1* 4/2023 Tang .................. G06Q 20/3672 705/66
2023/0222491 A1* 7/2023 Pacella .................. G06Q 20/06 705/69
2023/0298001 A1* 9/2023 Jethmalani ............. G06Q 20/36 705/65
2024/0211909 A1* 6/2024 Lal ......................... G06N 20/00
2025/0165565 A1* 5/2025 Inoko ................... G06Q 20/123

FOREIGN PATENT DOCUMENTS

WO WO-2024111360 A1 * 5/2024 ............. G06F 21/60
WO WO-2024209824 A1 * 10/2024 ............. G06F 21/31

OTHER PUBLICATIONS

Hickey, "What are cross-chain NFTs," (https://www.finder.com/cross-chain-nfts) (Nov. 15, 2022) (9 pages).

(Continued)

*Primary Examiner* — Courtney P Jones
(74) *Attorney, Agent, or Firm* — HG LAW LLP

(57) ABSTRACT

Systems and method are disclosed herein comprising receiving a request to record a proposed owner of an asset at a central authority, verifying an asserted owner is a current owner of the asset based on data from a record managed by the central authority or a distributed ledger, determining an indication that the asset is not managed by the distributed ledger, and, after determining that the asset is not managed by the distributed ledger and verifying an asserted owner is a current owner of the asset, recording the proposed owner of the asset in a record of the asset at the central authority, the record comprising data indicating an asset identification and an owner identification based on the verified owner indicating the proposed owner.

20 Claims, 8 Drawing Sheets

(56) References Cited

OTHER PUBLICATIONS

PolkaCipher, “Private Off-chain NFP Transactions are possible! Find out how,” (https://polkacipher.medium.com/private-off-chain-nft-transactions-are-possible-find-out-how-7f292ff45cfe) (Oct. 11, 2021) (16 pages).
Wells, “How to Mint a Private NFT,” (https://www.benzinga.com/money/how-to-mint-a-private-nft) (Apr. 7, 2022) (10 pages).

* cited by examiner

700

| | Asset ID | Owner ID | Crypto-currency | Contract Address | NFT Token ID | NFT Status | Content Address |
|---|---|---|---|---|---|---|---|
| | | | | | | | |

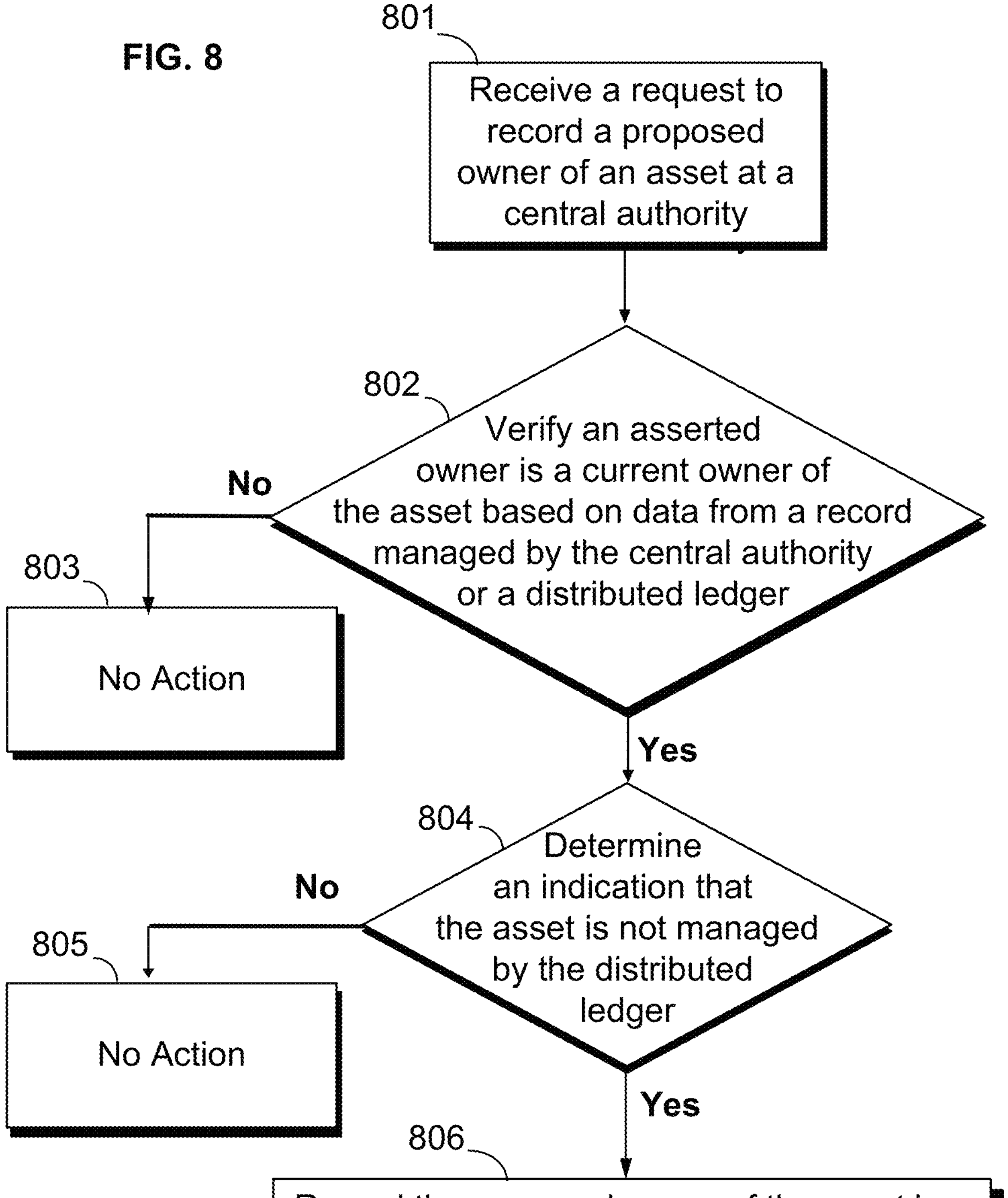
FIG. 8
801
Receive a request to record a proposed owner of an asset at a central authority
802
Verify an asserted owner is a current owner of the asset based on data from a record managed by the central authority or a distributed ledger
No
803
No Action
Yes
804
Determine an indication that the asset is not managed by the distributed ledger
No
805
No Action
Yes
806
Record the proposed owner of the asset in a record of the asset at the central authority, the record comprising data indicating an asset identification and an owner identification based on the verified owner indicating the proposed owner.

SECURING PEER-TO-PEER TRANSFER OF COLLECTIBLE PERSONAL 3D DIGITAL ASSETS FOR SALE IN THE METAVERSE

TECHNICAL FIELD

One or more aspects of the present disclosure are directed to methods and systems for managing ownership rights of a digital asset by a central authority. In particular, the present disclosure includes methods and systems for verifying that the asset is not managed by both a distributed ledger and the central authority.

BACKGROUND

More and more content is stored digitally. This digital content may be shared between individual users. In some scenarios, authenticity of shared content is of concern. One way to guarantee authenticity of digital content is by using blockchain technology, such as minting an NFT connected with the content. Many individuals prefer to avoid using blockchain or NFTs, however, due to the complexity and novelty of these techniques.

SUMMARY

The present disclosure relates to a central or centralized authority for the share and transfer of digital assets such as avatar models, skins, shoes, bags, hats and other digital creations. The claimed central authority allows for peer-to-peer (p2p) transfers of these assets to happen quickly and simply. For example, the transfers may be similar to financial transfers in Venmo or Zelle where a first user can send an asset to a second user with one or two clicks. The central authority allows users to transfer the assets safely and with confidence. In existing systems, these assets are typically shared via blockchain technology. An NFT is minted to represent the asset and its ownership is tracked on a distributed ledger. If an owner wants to transfer the rights to an asset connected to an NFT, for example, if an owner enters into a transaction to sell the asset to a buyer, the owner will update the NFT record on the distributed network. This process takes place at an NFT marketplace, or a platform that supports transfers, such as buying and selling, of NFTs. The NFT marketplace will enact the update during this process, causing the distributed ledger to contain new ownership information for the specific NFT tied to the asset. Although the NFT may be transferred, the asset itself, that is the digital file or files which make up the NFT, may remain in the same location. This approach has several drawbacks however. Typically, blockchain ledgers do not offer the owner confidentially as they are publicly inspectable. NFTs are difficult to use as well and require specialized wallets and know-how to be able to buy and sell them. Even then their transfer can be cumbersome. Further, distributed ledgers have not been proven in the long term and there is skepticism surrounding their legitimacy. Thus, while some people may have an interest in buying or collecting digital assets, many are unwilling to use NFTs. This unwillingness to deal with NFTs cuts them off from one of the most popular avenues for buying and collecting unique digital assets for which ownership is tracked and authenticated.

However, the desire for unique digital assets continues to rise. Of course, the ultimate appeal of unique digital assets is limited if ownership of each unique digital asset cannot be easily tracked and authenticated. Further, the appeal of unique digital assets is limited if the digital assets themselves cannot be exchanged in a manner that facilitates ownership tracking and authentication. For reasons already described, typical NFT implementations do not address these issues limiting the adoption of unique digital asset transacting and collecting. The present disclosure discloses systems and techniques addressing these issues. For example, the present disclosure discloses a solution by way of a central authority that tracks the ownership of the assets.

In an embodiment, an ownership history of digital asset may tracked by way of the central authority if the owner desires. In some instances, the ownership history may be copied, in whole or in part, from an NFT record on a distributed ledger. In some instances, an owner may wish to track ownership of a digital asset via a record on the central authority rather than via an NFT and associated records on a distributed ledger. In such instances, the central authority may verify that, for a digital asset of interest, a corresponding NFT has been burned. This may be done to prevent parallel ownership tracking where, for example, a particular NFT indicates a first owner for an underlying digital asset and a central authority record indicates a second owner for the same underlying digital asset. Accordingly, before the central authority takes on the role of tracking ownership in a manner that indicates the distributed ledger for NFTs is no longer the final arbiter of ownership, the central authority require verification that any NFT alleged to represent the digital asset in question has been burned. In the process of transferring ownership management of an asset to the central authority, the disclosed systems and techniques will first determine whether or not a record for an NFT associated with the asset exists in a distributed ledger. If there is not a corresponding NFT, the present systems and techniques will determine an owner ID associated with the asset representing the owner of the asset and create a record of ownership of the asset in its databases. The record within the central authority comprises a table associating the asset ID for identifying the asset with an owner ID. The central authority tracks ownership of the asset by updating the record each time an asset is transferred to reflect the change.

The disclosed techniques also allows a user to transfer ownership management of the asset from the central authority and place it on a distributed ledger. In that case, the central authority simply updates the record to indicate that its ownership is no longer tracked there and the user mints a new NFT tied to the asset.

BRIEF DESCRIPTION OF THE DRAWINGS

FIG. 7 shows an example ownership table in accordance with an embodiment of the disclosure; and FIG. 8 shows a flow chart of one method of the present disclosure in accordance with an embodiment.

DETAILED DESCRIPTION

Figure 1:
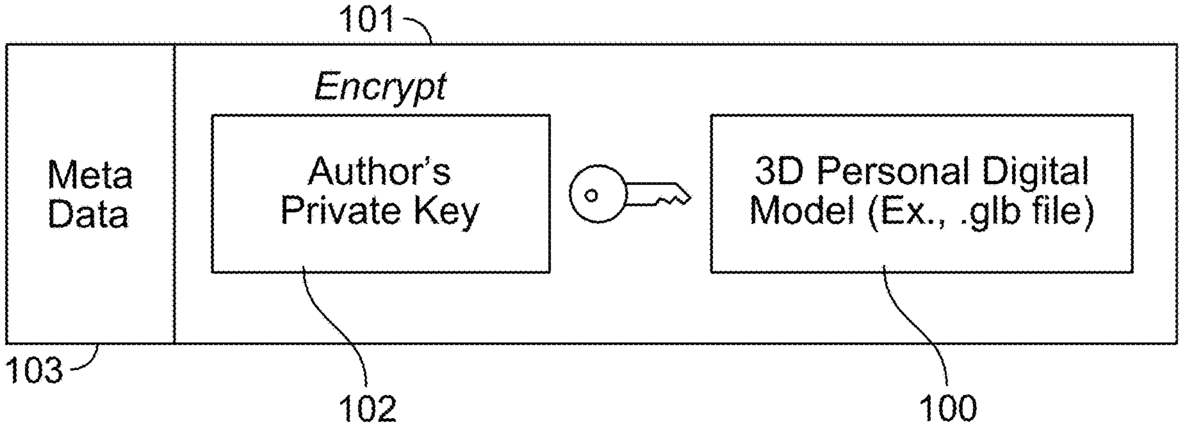
FIG. 1 shows an example encryption of an asset in accordance with an embodiment of the disclosure.

As referred to herein, the term "distributed ledger" refers to any kind of data record, data structure, or database that includes records of any kind of sale, purchase, lease, loan, option, any other financial transaction, or any combination thereof that is stored in a distributed manner. In a typical distributed ledger, multiple copies of the underlying ledger are stored at multiple different nodes or devices (e.g., at hundreds or thousands of devices). For example, instances or copies of a distributed ledger may be stored on several devices (e.g., user devices, server devices, cloud devices, or any combination thereof) at the same time. In a typical example, when a change to the distributed ledger is needed (e.g., when a new record is to be added regarding a new transaction), a critical number of nodes must reach consensus regarding the change or transaction. At that point, the change is propagated through the nodes of the distributed ledger network, and every copy of the ledger is updated accordingly. In some embodiments, each device may store the entirety of the distributed ledger. In some embodiments, each device may store a portion of the distributed ledger (e.g., representing recent number of transactions or changes to the ledger).

As referred to herein, the term "blockchain" refers to any kind of data record, data structure, or database that comprises a plurality of blocks that are linked to one another in a way that increases the security of the entire blockchain ledger. For example, each block of the blockchain ledger may include a hash calculated based on all other data of that block. In this example, each block of the blockchain ledger (that is not an initial block) may also include a hash of a previous block in the blockchain ledger.

Blockchain may be implemented by way of a distributed ledger. For example, copies of blockchain or portions may be stored by multiple devices. Due to the hash chaining, no single malicious user can fake the content of any block without compromising every single copy of the blockchain. Blockchain may include a first set of blocks for tracking the ownership of an asset. For example, the first block in the first set may identify asset. This method of tracking an asset is popular as it enables users to validate authenticity. However blockchains and distributed ledges have drawbacks as discussed above and a record associated with an asset might at times be removed from the blockchain and traded in a peer-to-peer manner. In this case authenticity remains important yet is no longer managed. The present disclosure provides a means for tracking assets once managed by blockchain when they are traded by a peer-to-peer transaction by confirming that an NFT associated with an asset is no longer active on the blockchain and then maintaining a record of ownership.

The present disclosure comprises a central authority which manages the ownership of one or more signed digital assets. The central authority may be any combination of software and hardware configured to manage ownership of digital assets in accordance with the techniques described here. In an embodiment, the central authority is or includes an application, routine or set of instructions that, when executed, implement one or more of the described techniques. The central authority may be implemented by any number of processors, computing devices, or hosts. Performance of operations attributed to the central authority may be distributed among one or more processors, which may reside within a single machine or may be deployed across several machines.

Digital content items can be any digital file but most often refer to unique media items such as images, video, 3 D media (e.g., models), or avatars. Digital content items in some contexts may be easily reproducible by, for example, creating a copy of the file containing the content. The copies can then be shared, either in terms of a transfer or sale, or publicly displayed. Given the potential for reproductions, it becomes vital that one can verify the authenticity of a digital content item and its owner. NFT avatars, for example, embody status in an exclusive community, and while the underlying avatars can be copied, the NFTs verify ownership of the underlying avatars through the blockchain record. In some cases, authorized owners benefit from perks and status tied to the their verifiable ownership status. For example, Yuga Labs, the creator of Bored Ape Yacht Club (BAYC) NFTs announced a collaboration with Polygonal mind, a creative game development studio, to develop 3D models of bored apes and mutant apes for use in the metaverse, a benefit that will accrue to "ape holders" (i.e., its NFT holders). In another example, an artist who works in digital media may want to sell his or her artworks, for example photographs. If these digital artworks are easily reproducible, there may be little incentive to buy the work from the artist. Instead, many people will choose to simply create a copy the artwork. In this scenario it becomes vital that authenticity and ownership is verifiable.

Typically, to ensure authenticity an author will digitally sign a digital content item with a digital private key as seen in FIG. 1. Digital content may be signed to create a signed digital asset in order to demonstrate ownership. In a typical example, a signature scheme may involve three algorithms.

First, a signature scheme may involve a key generation algorithm. In a typical example, Alice (for example) may have a private key (theoretically known only to Alice) and a public key (which may be known or observable by others). Together, these two keys make up a key-pair. The two keys in a key-pair may be generated via the key generation algorithm known in the art such that they are mathematically linked.

Second, a signature scheme may involve a signing algorithm that accepts two inputs: (i) a private key (e.g., Alice's) and (ii) a message (e.g., avatar data). The private key and the public key are mathematically linked such that, if Alice's private key is used to sign a digital asset, the signing algorithm will produce a unique signature that can be verified as having been produced via the private key using only Alice's public key (i.e., without having access to Alice's private key). Typically, a given signature can only be reproduced via the signing algorithm when a corresponding public key and original message (e.g., Alice's avatar) are used as input. Different inputs to the signing algorithm will produce different signatures. In some instances, a cryptographic hash is developed to which the signing algorithm is applied. A cryptographic hash allows one to take any amount of data and represent that bit of data as a short string of text. This short string of hashed text may be referred to as a message digest or hash. Generally, the original data used to create a hash cannot be reproduced from the hash. However, a stored hash can be compared to a recently generated has to verify that the same underlying input data was used to create the two hashes. In any event, Alice may provide, as input to the signing algorithm, (i) the hash from her avatar data, and (ii) her private key. The signing algorithm may produce from these inputs a digital signature (e.g., an encryption of the underlying hash, having a value such as "SIG123").

Third, a signature scheme may involve a signature verifying algorithm that accepts three inputs: (i) a public key (e.g., Alice's), (ii) a message (e.g., avatar data), and (iii) a digital signature. For example, given a digital asset, an asserted signature, and a public key for the alleged signor for the digital asset, the signature verifying algorithm can provide an output that indicates whether or not the private key (linked to the public key) was used to sign the digital asset. To illustrate, if Bob receives a digital asset from Alice, he should be able to decrypt the encrypted file to reveal the avatar data (assuming it was encrypted). He may then feed to the signature verifying algorithm: (i) Alice's public key, (ii) the avatar data, and (iii) the digital signature. This may verify whether or not Alice signed the avatar data. In one example, the digital signature (e.g., "SIG123"), when decrypted with Alice's public key, should match a hash value (e.g., "HASH8342") that can also be produced by hashing the avatar data.

FIG. 1 shows the unencrypted digital content item 100. This digital content item 100 exists as a digital file. To sign the digital content item 100 the author encrypts the file storing the digital content item 100 using a code, referred to herein as a private key 102. The author may further embed metadata 104 related to the digital content item 100 such as the author's public key, description, legend, value/price etc. after digitally signing the digital content item. The digital content item 100 may be any digital file. In an embodiment, the digital content item 100 is a unique media item such as a 3 D model, image, video, .gif, interactive element such as a non-static avatar, or pattern. The digital content item 100 may be stored in a number of file types, for example a .glb file. The digital content item 100 may be initially stored by the author for example on an author's computer, external hard drive, cloud account, or other medium for storing digital files. The author encrypts the stored file, digital content item 100 (or a hash of the digital content item 100), with the author's private key 102. The author's private key 102 may be an alphanumeric string, file, or other code that may be used by the encryption algorithm to encrypt the file. In some embodiments, the author finally adds metadata 103 to the file package (which may include the author's verifiable public key), if desired, as discussed above, creating a signed digital asset 101 that can be verified as being linked to the private key 102 (thereby enabling verification that the signed digital asset 101 was "signed" by the author or creator).

Figure 2:
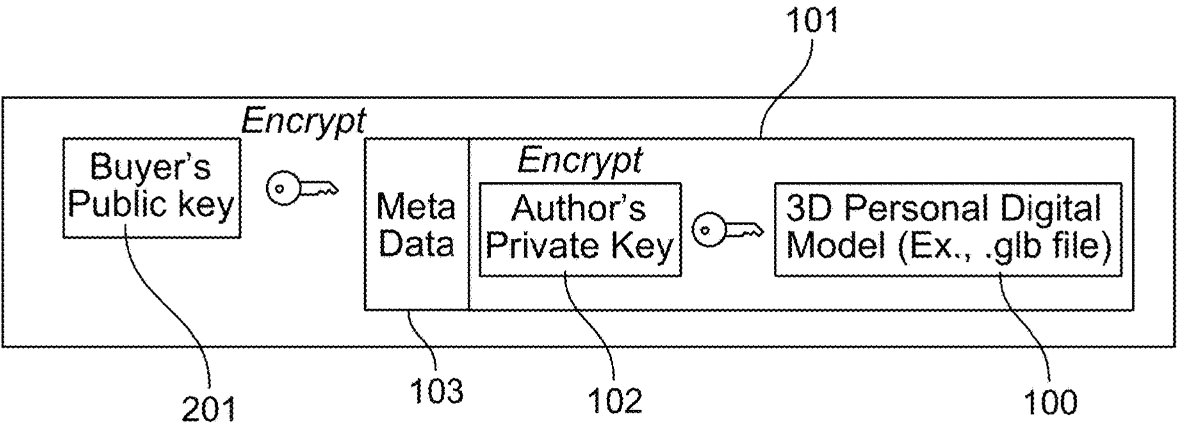
FIG. 2 shows an example encryption of an asset in the context of a transaction in accordance with an embodiment of the disclosure.

When a commercial transaction occurs, that is when the signed digital asset 101 changes owners, the current owner (e.g., the sender or seller) may encrypt the model with the proposed owner's (e.g., the receiver's or buyer's) public key 201 as seen in FIG. 2. The public key 201 may be used to encrypt the asset file 101 for transfer. The encryption ensures confidentiality since only the proposed owner can retrieve the signed digital asset 101 due to encryption. Users and authors have access to cryptographic-grade asymmetric key technology like RSA 4096 or ECC, commonly available today and known in the art. Numerous services like Keybase or Protonmail provide these services today.

Figure 3:
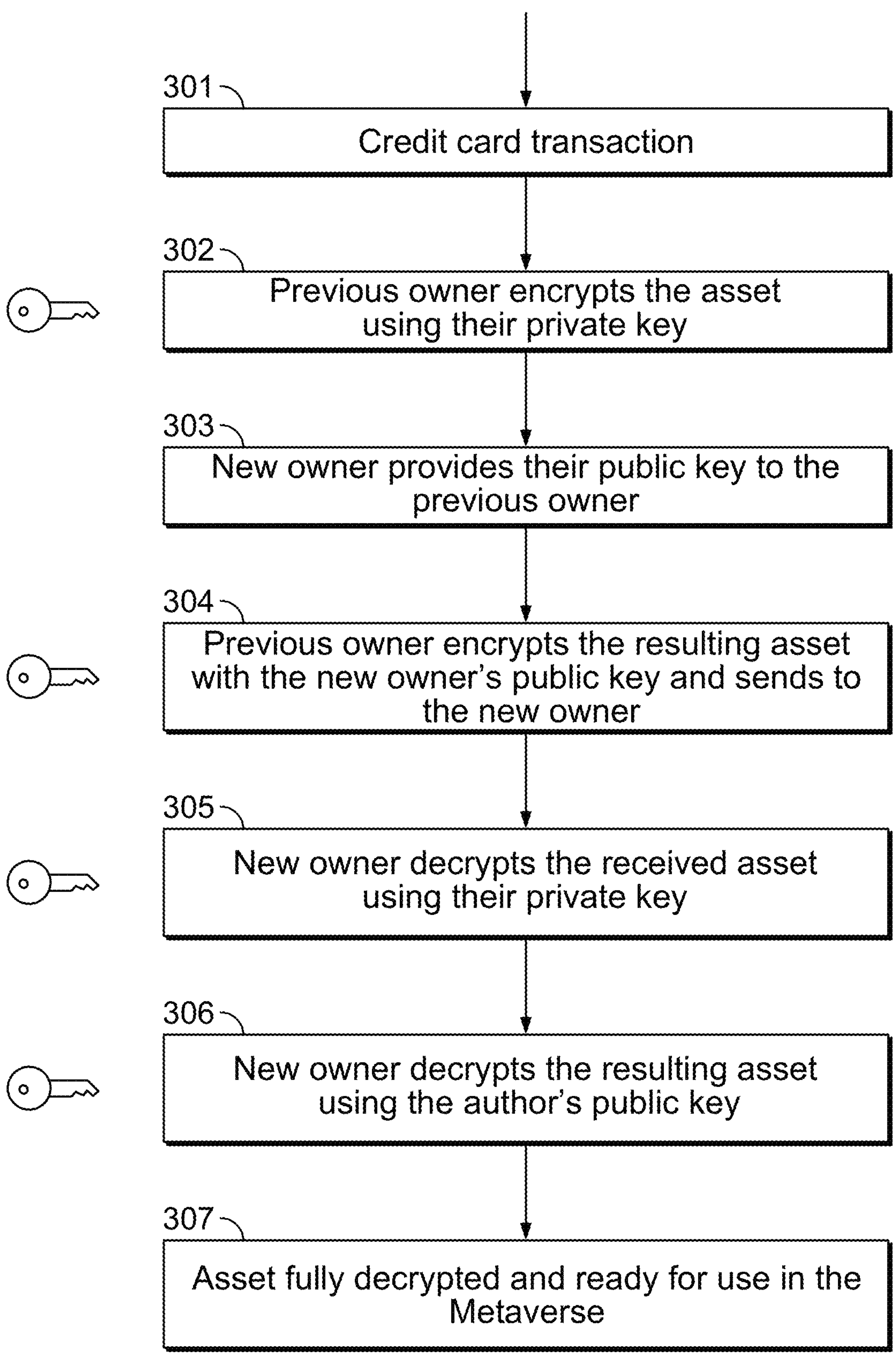
FIG. 3 shows a flow chart outlining the processes of an example asset transaction in accordance with an embodiment of the disclosure.

An example method 300 for transferring custody of a unique digital asset, involving a financial transaction, is portrayed in FIG. 3. The method 300 begins at step 301 with a credit card transaction, or other similar transaction, in which a proposed owner, a buyer sends funds through a financial institution to a current owner, or seller of a signed digital asset 101. Any suitable financial platform, whether included in the hardware/software implementation of the techniques described in this disclosure, or external to the system, may be used to conduct the transaction between a buyer and a seller. In exchange the seller will transfer the signed digital asset 101. For example, the seller may transfer the signed digital asset 101 from his or her p2p client to a p2p client of a buyer. At the next step 302, the seller encrypts the file containing the digital content item 100 that may be stored with the seller using a private key 102 to create encrypted signed digital asset 101. At step 303 the buyer provides a public key 201 to the seller. The public key 201 may be a non-confidential component to the encryption process and may be available in a number of forms. At step 304, the seller encrypts the signed digital asset 101, a digital file, using the buyer's public key 201 and sends this encrypted file to the buyer. At 305 the buyer receives the encrypted file from step 304 and decrypts the file using the buyer's private key. At 306, the buyer decrypts the file embedded in the encrypted file created at step 304 using the seller's public key. As a result, at step 306, the buyer gains access to signed digital asset 101 and the signed digital asset 101 may be fully decrypted and ready for use.

In an embodiment, the method shown in FIG. 3 may be implemented to facilitate p2p transactions involving digital content associated with an NFT (e.g., that has or will be burned). In an embodiment, the shown method may be implemented to facilitate p2p transactions involving digital content for which no NFT counterpart exists.

Figure 4:
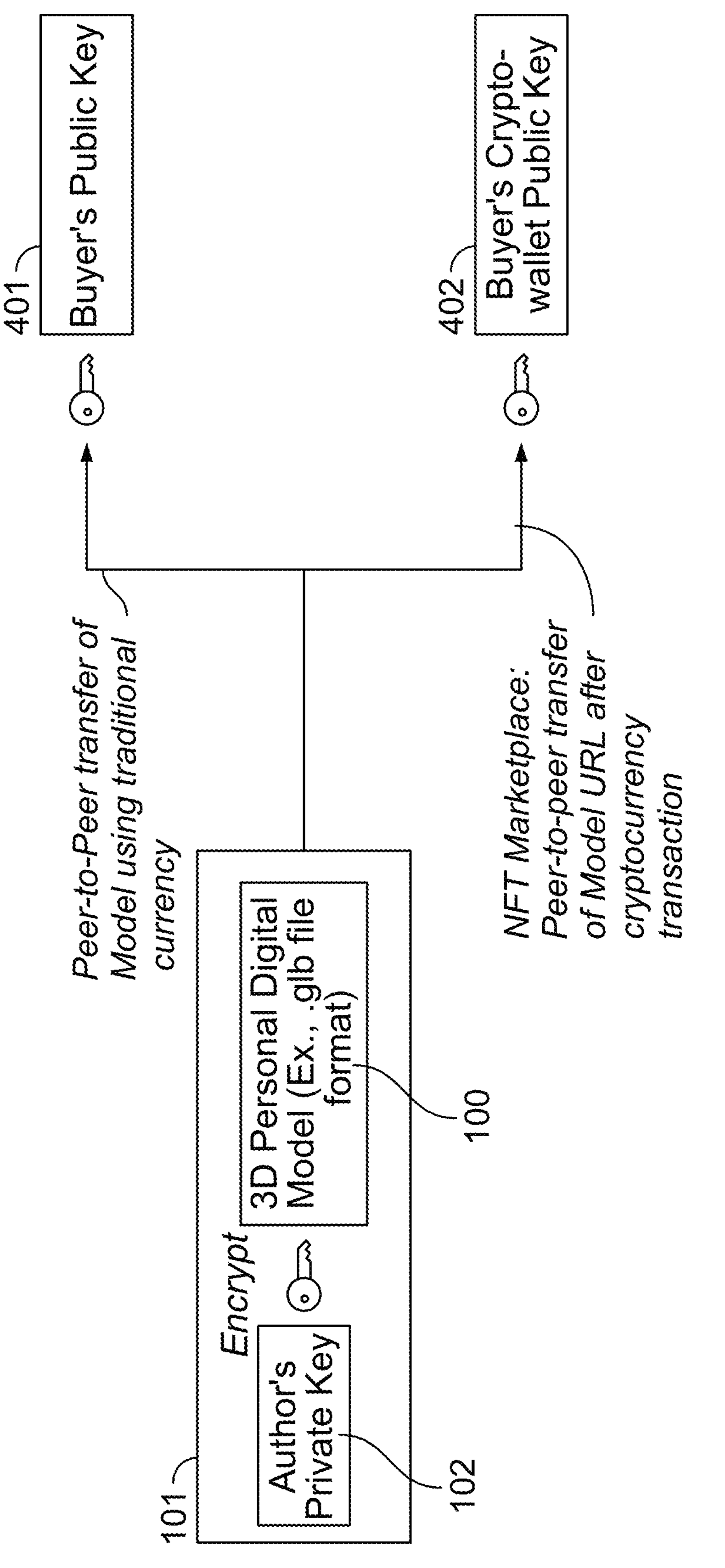
FIG. 4 shows a comparison of example encryptions of an asset in both the peer-to-peer and NFT environments in accordance with an embodiment of the disclosure.

FIG. 4 shows a comparison of example encryptions in both peer-to-peer and NFT environments, according to an embodiment. In both environments the asset 100 may be encrypted using the creator's private key 102 to create signed digital asset 101. In the peer-to-peer environment the previous owner encrypts the signed digital asset 101 using the new owner's public key 401 while in the NFT context the previous owner encrypts the signed digital asset 101 using the new owner's cryptocurrency wallet public key 402.

NFTs ("Non-fungible Tokens") have arisen as a means to track authenticity of a digital item. An NFT is tied to a distributed network, e.g., blockchain such as Ethereum, which maintains a record of ownership on the network. By tying a digital asset to an NFT, authenticity and ownership can be verified by inspecting the blockchain. As discussed above, however, many people prefer to avoid NFTs. If the ownership tracking and authentication problem can be solved, people may prefer to transfer ownership of digital assets in some other manner.

If the current owner of the signed digital asset 101 wants to offer it for sale as an NFT using cryptocurrency, upon receipt from the current owner the buyer decrypts the received signed digital asset 101 using his or her private key, while keeping the digital signature of the author intact with the digital content item 100. The owner then mints, or generates, the NFT on a cryptocurrency blockchain using an NFT marketplace. The minting process effectively creates a transaction on the crypto blockchain with a global unique pair (contract address, token ID) that is associated with the current owner's cryptocurrency wallet. In this case the first entry, or block, in the history or chain, will be the creation of the NFT rather than the creation of the digital content item 100 or signed digital asset 101. While the token ID is an identifier of the signed digital asset 101, the contract address is a pointer to the smart contract for the NFT representing the signed digital asset 101 on the cryptocurrency blockchain. Together, the globally unique pair represents the signed digital asset 101 and its place on the cryptocurrency blockchain after it has been minted.

Figure 5:
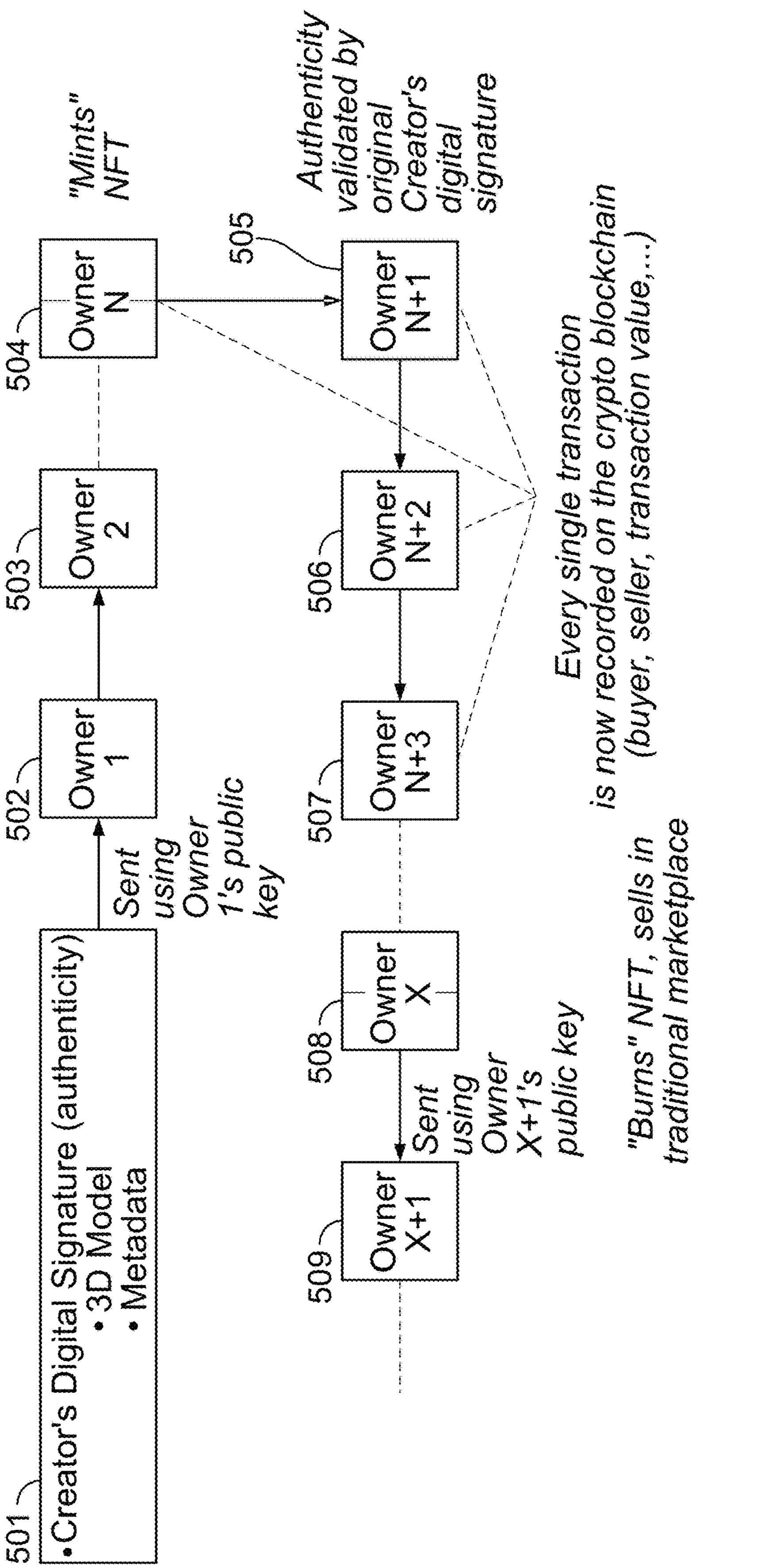
FIG. 5 illustrates an example chain of transactions involving one asset in accordance with an embodiment of the disclosure.

Alternatively, an exchange of the signed digital asset 101 may take place without the use of NFTs or the blockchain (e.g., and without the use of an NFT marketplace). For example, an exchange may take place via peer-to-peer clients that are configured to coordinate with the central authority. For example, the exchange may take place in a specialized app for trading signed digital assets 101. In another embodiment the transaction takes place in a more generalized marketplace. In the scenario where the exchange is a peer-to-peer transaction, the authenticity of the signed digital asset 101 remains valuable. The present disclosure offers a central authority for tracking authenticity of signed digital assets 101 transferred in this manner by verifying the status of the signed digital asset 101 on the blockchain and recording owners and transfers on the central authority. It thereby manages the authenticity and ownership of these items. A signed digital asset 101 need not be confined to one means of transferring ownership however. In some embodiments, a signed digital asset 101 may move between crypto exchanges and peer-to-peer exchanges in the course of its existence. A series of mixed transfers is shown in FIG. 5, for example. At 501, the signed digital asset 101 may be created by linking the digital content item 100 to metadata and a signature of the creator. At 502 the signed digital asset 101 may be sent by a peer-to-peer transaction to Owner 1 using Owner 1's public key. At 503, Owner 1 transfers ownership of asset 101 to Owner 2 in a peer-to-peer transaction. Eventually, through a series of transactions the signed digital asset 101 reaches Owner N, an arbitrary owner in the ownership chain of asset 101, at 504. Owner N receives the signed digital asset 101 and mints an associated NFT. Transactions transferring the NFT, and thereby the ownership of asset 101, are thereafter recorded on the blockchain of the distributed ledger associated with the NFT. Owner N transfers the NFT to Owner N+1 at 505 where authenticity of asset 101 may be validated using the original creator's signature. At 506 Owner N+1 transfers the signed digital asset 101 to Owner N+2 and at 507 Owner N+2 transfers the signed digital asset 101 to Owner N+3. Steps 505, 506, and 507 are each recorded on the blockchain. At 508, the NFT reaches Owner X, a second arbitrary owner, through a series of transactions, and Owner X burns the NFT, ending the presence of the asset as an NFT that is transacted on the blockchain. Transfers of ownership of asset 101 are no longer recorded on the blockchain. At 509, Owner X transfers the ownership of asset 101 in a peer-to-peer transaction using Owner X+1's public key. Owner X+1 is now the owner of asset 101.

Figure 6:
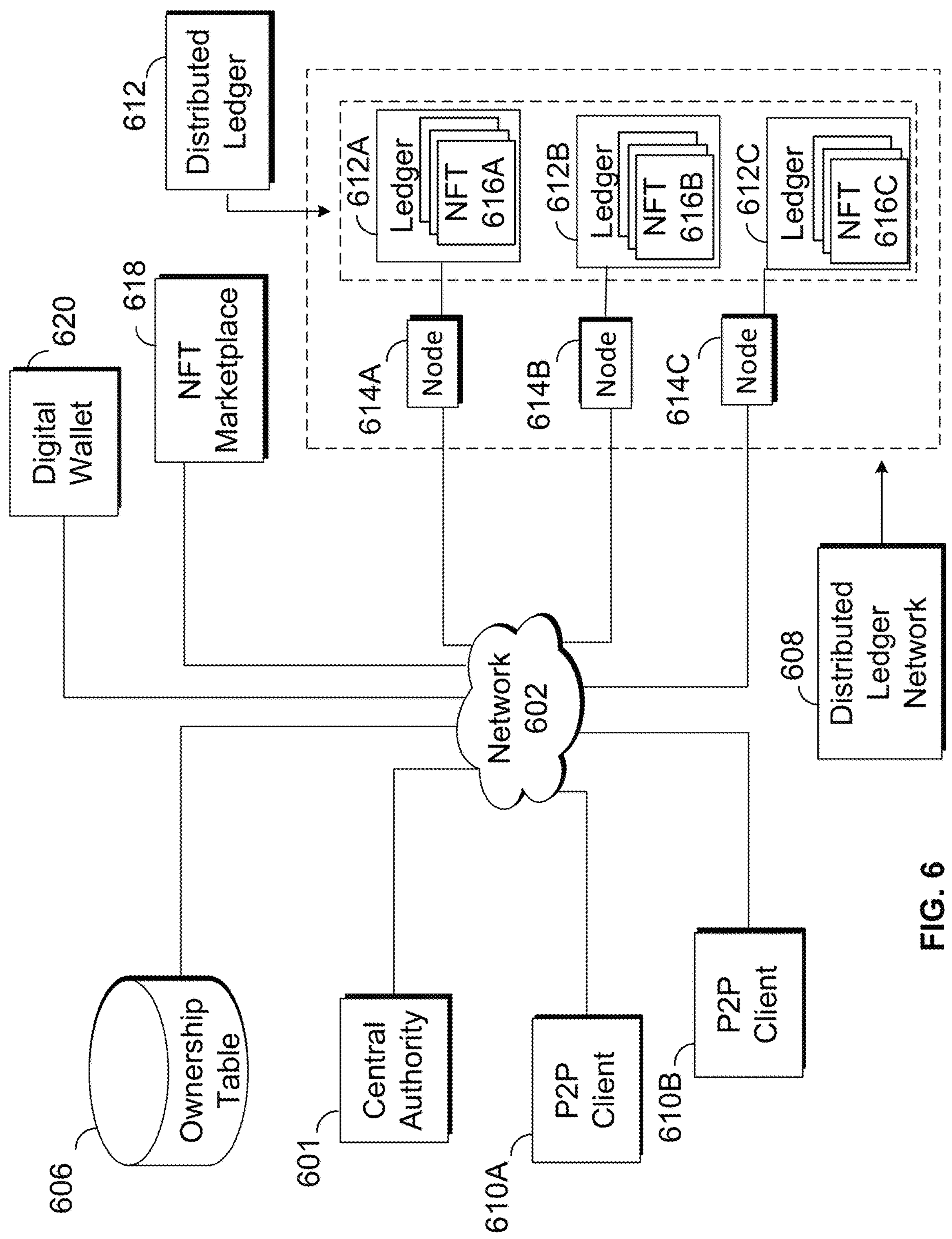
FIG. 6 shows an example environment of the present disclosure.

FIG. 6 shows an exemplary system 600 including an example central authority 601, according to an embodiment. In an embodiment, the central authority 601 is communicatively connected to devices and functions through a network 602.

In an embodiment, the network 602 may be or include any communication network that enables communication between nodes, such as the systems and devices shown in FIG. 6. The network 602 may be or include any one or more networks including the Internet, a mobile phone network, mobile voice or data network (e.g., a 5G, 4G, or LTE network), cable network, public switched telephone network, a local area network (LAN), a wide area network (WAN), a personal area network (PAN), or other types of communication network or combinations of communication networks. The network 602 may include communication paths or links between nodes. The depicted communication paths or links (e.g., depicted as lines connecting the respective devices to the network 602) may separately or collectively include one or more intermediate nodes (not necessarily shown) and/or one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. In an embodiment, one or more of the devices shown in FIG. 6 may communicate directly with other devices shown in FIG. 6. For example, in an embodiment, the P2P clients 610 may communicate with each via a PAN network or link, such as a Bluetooth connection. While communications between a given system and the network 602 (and communications between the given system and other systems connected to the network 602) may be enabled by one or more of these communications paths, these communication paths may be shown as a single path in FIG. 6 to avoid overcomplicating the drawing.

The central authority 601 may be communicatively connected to ownership table 606 through network 602. Ownership table 606 may in some embodiments store data regarding a signed digital asset 101 such as identifying information, location, and ownership information, and allow the central authority 601 to track the ownership of a signed digital asset 101. In some embodiments the central authority 601 includes processing circuitry for executing functions including retrieving and/or comparing information from ownership table 606. The p2p clients 610A and 610B may be communicatively connected to the network 602. It will be understood that p2p clients 610A and 610B are representative and that additional devices may exist in the system 600. P2p clients 610A and 610B may communicate, using the network 602, with each other to facilitate a transaction, such as exchanging a signed digital asset 101. In an embodiment the p2p clients 610A and 610B may communicate with the central authority 601 (or any other system coupled to the network 602) through the network 602.

In an embodiment, a distributed ledger network 608 utilizes the network 602, in whole or in part, to facilitate communication between nodes of the distributed ledger network 608. The distributed ledger network 608 may be part of (at least in part), or communicatively connected to, the network 602. The distributed ledger network 608 may include a distributed ledger 612 and a set of nodes 614A-C. The distributed ledger 612 includes a series of ledgers 612A-C (e.g., synchronized), each of which represents a copy or version of the same data or record representing the distributed ledger 612. The ledgers 612A-C may be managed (e.g., updated) by the nodes 614A-C.

In an embodiment, the distributed ledger 612 stores an NFT 616. As shown, each ledger 612A-C stores a version or copy 616A-C of the record representing the NFT 616. When information relating to the NFT 616 is to be updated (e.g., to indicate a new owner), the nodes 614A-C coordinate to update the NFT records 616A-C at the ledgers 612A-C in a coordinated fashion.

In an embodiment, an NFT marketplace 618 is communicatively connected to the network 602. The NFT marketplace 618 may enable exchanges of NFTs, such as the NFT 616.

In an embodiment, a digital wallet 620 may be communicatively connected to the network 602. The digital wallet 620 may store a user's personal information such as keys, passwords, and/or payment information, and may be used in connection with the NFT marketplace 618 to direct exchanges of an NFT. For example, a user may utilize the digital wallet 620 to provide a key that is needed for authentication (e.g., to provide the user has authorization to transfer an NFT to a different address or wallet).

In an embodiment, the described techniques offer, by way of the central authority 601, ownership management or signed digital assets 101 (e.g., in cases where ownership of the signed digital assets 101 is not tracked on the distributed ledger 612 or some other blockchain). The central authority 601 may be used in connection with a number of different transactions. In one example, as seen in FIG. 5, a signed digital asset 101 may be exchanged, over the course of a period of time, both in transactions that are recorded on a distributed ledger and in transactions that are not. Such a signed digital asset 101 may be tracked on the central authority 601 at times when the related NFT(s) is/are burned, despite the fact that records of the signed digital asset 101 once existed on a distributed ledger. The central authority 601 can ensure that an authorized owner of the signed digital asset 101 removed a token or NFT representing the signed digital asset 101 from the blockchain before creating or updating a record to indicate that the central authority 601 is an ultimate arbiter of who the owner is. For example, the central authority 601 may verify that a corresponding NFT (e.g., the NFT 616) is burned before creating a record that indicates the central authority 601 (e.g., and not the NFT record or records) maintains the most recent and accurate record of ownership for the signed digital asset 101. In an embodiment, an NFT is burned by "transmitting" the NFT to a burn wallet having no owner and from which the NFT is irretrievable. The central authority 601 may utilize a blockchain inspector or explorer tool to verify that an NFT corresponding to the signed digital asset 101 has been removed (e.g., burned). For example, the central authority 601 may query the distributed ledger 612 (e.g., via a blockchain explorer) by using a known token address or contract address for an NFT associated with the digital asset 101. If the NFT has not been burned, the central authority 601 may reject an effort to make a record at the table 606 indicating that the central authority 601 is the ultimate arbiter of ownership. In some instances, the central authority 601 may create or update a record for the signed digital asset 101 that indicates that the NFT record or records reflect ownership of the signed digital asset 101. By coordinating with the NFT record(s), the central authority 601 ensures (when appropriate) that the central authority 601 is the manager (e.g., exclusively) of the ownership rights of the signed digital asset 101 and that the recorded owner is the correct owner. This step allows the central authority 601 to manage signed digital assets 101 which have at some point in their history been managed by a distributed ledger.

In some embodiments the central authority 601 maintains a table 700 seen in FIG. 7. In an embodiment, the table 700 represents an example of the information that may be stored to the table 606 shown in FIG. 6. In some embodiments each row of table 700 represents a signed digital asset 101, each column in one row providing information about the same asset 101. The table in some embodiments comprises columns, for example an asset ID column 701 and an owner ID column 702, for tracking the ownership of a signed digital asset 101. In some embodiments the asset ID 701 column includes a unique asset identifier identifying asset 101. In some embodiments the asset identifier may be any entry used to identify the signed digital asset 101 and may be for example an assigned arbitrary string of characters or a URI file. In some embodiments the owner ID column 702 include an owner identification identifying a current owner of asset 101. The owner identification may be for example a name, identification number, or other entry used to identify an owner. In an embodiment the owner identification is or includes the public key of the owner's digital wallet used for p2p transactions. This key may also be cross-referenced, even perhaps in a separate table, to the owner's crypto-wallet public key, which is the owner's identification on the crypto blockchain.

In some embodiments the table comprises information regarding NFT minting such as cryptocurrency column 703, indicating which blockchain the asset is currently referenced on or the last known cryptocurrency using which the asset was transacted. The table may comprise contract address column, 704, and NFT token ID column 705, and NFT status column 706. In some embodiments the table 700 includes content address column 707, in which the hash of the signed digital asset 101 is stored. In some embodiments, the content address, the hash of the signed digital asset, may also be used as the asset identifier The columns related to NFT minting allow the central authority 601 to coordinate with NFT records. Central authority 601 coordination with NFT records may be important in some embodiments because it ensures, by tracking the status of an NFT, that there is only one authority of ownership of a given signed digital asset 101. For example, if an NFT exists and is active, the central authority 601 cannot be the authority of ownership of the asset tied to the NFT because the NFT record will be the authority. If however, the NFT no longer exists and has been burned, the central authority 601 may become the authority of the ownership of the asset tied to the burned NFT. Multiple authorities of asset ownership have a potential to contain conflicting records, for example one authority may show a different owner than another authority. Coordinating with the NFT records ensures that conflicting records are not created. The columns related to NFT minting in some embodiments allow the central authority 601 to track the NFT status of a signed digital asset 101, that is, the status of any NFT associated with the signed digital asset 101. NFT status column 706 may in some embodiments provide a summary of findings related to the NFT, including for example, whether or not it has been burned. If the NFT status indicates that the NFT has been burned, then the central authority 601 may know that it is the current authority regarding the ownership of the signed digital asset 101. The central authority 601 may in some embodiments use the information in the table 700 to locate an NFT associated with an asset and determine accurately if that NFT is active, e.g., not burned. If the NFT is burned, the central authority 601 may accurately determine that as well when it examines the associated NFT. In some embodiments, when the central authority 601 gets an NFT mint update, it updates the NFT mint table 700 with the new information indicating that the ownership of the signed digital asset 101 may be then managed by the distributed ledger. In some embodiments, if the central authority 601 gets an NFT burn update it may delete the signed digital asset 101 entry in the NFT mint table 700 so that the signed digital asset 101 cannot be cross referenced or it can mark the entry as invalid, indicating that a valid NFT once existed but is now burned. In some embodiments the table 700 may indicate that a lookup was performed but no data was retrieved. In some embodiments the central authority 601 may not get an NFT burn update. In this case when the central authority 601 gets a request to update ownership of that asset 101 through a selling-buying action, it checks the distributed ledger to determine that the signed digital asset 101 has been burned.

In an embodiment, the central authority 601 tracks, via the table 700 or the table 606, the ownership of signed digital assets 101 that are exchanged in a peer-to-peer manner. The signed digital assets 101 may be stored to any suitable storage or memory (e.g., by way of the p2p clients). This is similar to how assets tied to NFTs may not be stored on the crypto blockchain, but may only provide a reference to a URL. A signed digital asset 101 may be stored on a local computer or web using traditional centralized file systems methods and location-based addressing (DNS/IP) or using new methods such as IPFS (Interplanetary File System) which is a peer-to-peer file system using content-based addressing often used in Web3 applications. An IPFS node may also be a personal computer in the home (Bit-torrent style file system).

When ownership rights of a signed digital asset 101 may be moved to the central authority 601, the central authority 601 receives a request to begin managing the ownership rights of the particular asset 101 (e.g., from a user device or p2p client, such as client 610A or 610B, coordinating with the central authority 601). Ownership rights of a signed digital asset 101 might be moved to the central authority 601 when it is first created. In another embodiment a signed digital asset 101 might be moved to the central authority 601 from another ownership rights management structure. In some instances, an asset's 101 ownership rights are in the form of an NFT before the signed digital asset 101 is moved to the central authority 601 as NFTs are a popular way to track signed digital assets 101. NFTs are managed by a distributed ledger, e.g., blockchain, such as Ethereum, Polygon, Klayton, or Solana, which are publicly inspectable and provide information regarding ownership. In this case, the request includes a request to transfer ownership rights to the central authority 601. In some embodiments, an NFT burn update received by the central authority is interpreted as a request to transfer ownership rights to it. In some embodiments, a request to transfer an asset in a p2p manner initiates the process by which the central authority determines that ownership rights have been transferred to it. For example, if a burn update of the signed digital asset 101 is not received, but a p2p transfer update is received, the central authority 601 first verifies that the NFT has been burned. Then it verifies that the seller of the signed digital asset 101 has burned the NFT. Subsequently it updates its record to a new owner, the buyer.

The central authority 601 then, using an asset identification identifies the signed digital asset 101. Once the identity of the signed digital asset 101 is determined, the central authority 601 may locate the associated NFT on the distributed ledger, for example by locating its token address and contract address via table 700, to determine whether or not ownership tracking of the signed digital asset 101 is managed by the distributed ledger. In some embodiments the central authority 601 receives an update via table 700 on key transactions, based on which it determines what data to maintain. If the signed digital asset 101 is managed by the distributed ledger, that is, an NFT tied to the signed digital asset 101 is minted, it may not be a candidate for management by the central authority 601 since management by the central authority 601 would create a second record of ownership of the signed digital asset 101 which might lead to inconsistencies. In that scenario, the central authority 601 may not record ownership for that asset 101. If the central authority 601 has already begun recording ownership for the signed digital asset 101 and the central authority 601 determines via an update on key transactions that a NFT tied to the signed digital asset 101 has been minted, the central authority 601 may stop recording the ownership of asset 101. If the signed digital asset 101 is not currently managed by the distributed ledger, that is, there is no corresponding NFT associated with the signed digital asset 101, the central authority 601 may create a record for that asset 101 itself and record ownership of the signed digital asset 101 at the central authority 601. If a record of the signed digital asset 101 already exists at the central authority 601 and the central authority 601 has determined that the signed digital asset 101 is not managed by the distributed ledger, the central authority 601 may update its record of the signed digital asset 101 with any change in ownership. In some embodiments, a signed digital asset 101 is not managed by the distributed ledger because a previously existing NFT associated with the signed digital asset 101 has been burned, meaning the NFT has been deleted. Generally, burning an NFT is an irreversible transaction which effectively moves the NFT to an unrecoverable wallet. In other embodiments the signed digital asset 101 is not managed by the distributed ledger because an associated NFT was never minted. It should be noted that an owner's public key in case of NFT (such as the crypto wallet public key) and the same user's P2P transfer public keys are different, and thus in some embodiments the central authority 601 maintains an owner identification that is associated with both keys. When the central authority 601 receives the request, it may determine an owner identification corresponding to the signed digital asset 101 to ensure the asserted owner, the seller or person transferring, has the authority to transfer the signed digital asset 101 (e.g., ensuring the asserted owner is the rightful owner). The central authority 601 may determine if the person transferring is the rightful owner in some embodiments by comparing information, such as an identifier or public key, regarding the person transferring to owner records (which may also include an owner's identification such as a public key) stored on the ownership table 700. In some embodiments the central authority 601 determines that the person transferring is the rightful owner only when information regarding the person transferring matches its own records. The owner identification may be identified from data on the distributed ledger, such as identifying a public key 201, and will indicate a current owner of the signed digital asset 101. In some embodiments, the central authority 601 will determine this information using the asset's 101 contract address and token address to identify the information associated with the signed digital asset 101 on the ledger and confirm the public ownership information. In situations where no previous ledger exists, the central authority 601 may assign a new owner ID assigned to the current owner. If the central authority 601 has confirmed that the signed digital asset 101 in the request is not managed by a distributed ledger and has determined the ownership of the signed digital asset 101, it may begin managing the ownership rights of the signed digital asset 101 by creating (or updating) and storing an ownership table 700, or other tracking mechanism, associated with the signed digital asset 101.

The central authority 601 may track the signed digital asset 101 as it is transferred between p2p clients, such as client 610A or 610B. Encrypting the digital content item 100 with the original author's private key 102 ensures authenticity of the personally owned asset 101. When a transaction occurs, the current owner, a seller or sender, also encrypts the signed digital asset 101 with the proposed owner's, the buyer's or receiver's, public key 201, thereby ensuring confidentiality and authorized transfer. In this way, after the signed digital asset 101 has been encrypted with the proposed owner's information, only the proposed owner can retrieve the authentic asset 101.

In the event of a peer-to-peer transfer, the central authority 601 receives a request to update ownership records of the signed digital asset 101. This request may be any received message that causes the central authority 601 to update its records (or to begin the process of verifying that its records should be updated in accordance with the request). It then may verify transmission of the signed digital asset 101 itself from a first device or p2p client to a second device or p2p client. In some instances, the signed digital asset 101 may be transmitted without compensation (e.g., as a gift). In some instances, the central authority 601 may verify a payment alleged to be made in exchange for receipt of the signed digital asset 101. Both the asserted owner and the proposed owner may be verified using encryption keys provided in the transaction. In an embodiment a financial platform may broker the payment transaction. In that embodiment, the central authority 601 interacts with the financial platform and the financial platform verifies the payment and notifies the central authority 601 of the verification or lack thereof. If all information is verified, the central authority 601 may receive a notification to update its record assigning ownership to the new owner, that is, the buyer of the signed digital asset 101.

Every time the signed digital asset 101 changes ownership, the central authority 601 may be notified of the transaction and to change the owner of the signed digital asset 101 in its record. The buyer of a signed digital asset 101 may be incentivized to notify the central authority 601 to prevent the seller from re-selling the same asset 101 again and putting the buyer's ownership into question. Notifying the central authority 601 of a transfer may occur automatically via a client app designed for peer-to-peer transfer with central authority 601 arbitration.

In an embodiment, the central authority 601 provides ratings of users (e.g., buyers and sellers) to, for example, ensure the ecosystem is populated by good actors. In an embodiment the central authority 601 assigns or updates a rating for the parties involved in a transaction, including a proposed owner, such as a buyer, in response to receiving information about the exchange of the signed digital asset 101. The central authority 601 may in an embodiment utilize the ratings to discourage sellers from simultaneously holding out a signed digital asset 101 as a unique "one-off" item while replicating the signed digital asset 101 to sell multiple times. The ratings may be used to discourage users from attempting to sell signed digital assets 101 for which an NFT already exists and for which they do not control (e.g., and therefore cannot burn). This rating encourages honesty and builds trust in the central authority 601. The rating could be similar to a credit score in some embodiments.

In an embodiment, the buyer reports a transaction in a traditional marketplace, e.g., a peer-to-peer transaction, to the central authority 601 to claim ownership of the signed digital asset 101. This report also creates a handoff with the seller. An owner who mints an NFT associated with the signed digital asset 101 must provide the details of minting to the central authority 601 in an embodiment. The central authority 601 can also verify that a signed digital asset 101 which may be re-offered for sale in the traditional marketplace has been burned if it was offered for sale earlier as an NFT in a crypto marketplace. In some embodiments, failure to report ownership changes, NFT minting, or burning may get buyers and sellers "blacklisted" in a marketplace connected with the central authority 601.

In some embodiments the central authority 601 regularly monitors distributed ledgers for new instances of a particular asset 101 in its database. This monitoring protects against the situation in which a bad actor has copied the signed digital asset 101 and attempts to assert ownership over it.

In some embodiments the central authority 601 may provide ownership verification. In some embodiments, the central authority 601 receives a request to verify the ownership of a signed digital asset 101. The central authority 601 then determines, from the request, a unique identification for the signed digital asset 101. The central authority 601 then transmits verification or owner information in return to the received request.

In some embodiments, the central authority 601 provides an option for transferring the ownership rights of a signed digital asset 101 from the central authority 601 to a distributed ledger. In an embodiment, an owner mints an NFT associated with the signed digital asset 101, allowing the associated distributed ledger to manage the ownership rights of the signed digital asset 101 as long as the NFT is in existence. The central authority 601 then verifies that the signed digital asset 101 is minted by comparing the hash, and enters this information into its own database. In this way, the central authority 601 confirms that it no longer manages the rights of the signed digital asset 101. In this situation, when a user references the signed digital asset 101 at the central authority 601, it will inform the user that the central authority 601 no longer manages the rights to the signed digital asset 101. In some embodiments the central authority 601 will provide the contract and token addresses of the associated NFT when a user requests information about a signed digital asset 101 no longer under the management of the central authority 601.

A flow chart depicting an example method 800 for verifying and recording ownership of an asset (e.g., the signed digital asset 101) is provided in FIG. 8. The method 800 may be implemented, in whole or in part, by control circuitry, including processing circuitry, of, for example, a host or server that is implementing a central authority 601. For example, one or more of the aforementioned systems or devices, such as those shown in FIG. 6, may execute one or more instructions or routines stored to memory or storage of a device to implement, in whole or in part, the method 800.

At step 801, the central authority 601 receives a request to record a proposed owner of a signed digital asset 101. Such a request may be for example indicated in a message from a peer to peer (p2p) client, for example client 610A.

At step 802 the central authority 601 verifies that an asserted owner, e.g., as indicated in a message from a p2p client, is a current owner of the asset based on data from a record managed by the central authority 601 or a distributed ledger. The source for verification of the asserted owner may depend on where the ownership of an asset is maintained at the time of a transaction. In another example, if the ownership of the signed digital asset 101 is maintained at the 601 central authority 601 at the time of a transaction, when the method reaches step 802, the central authority 601 may check its own records, for example table ownership table 606, akin to table 700, to verify the owner. In some embodiments, the central authority only receives a request to update its ownership record when a p2p transaction is conducted between a seller and buyer. If the asset is managed as an NFT on a blockchain, the central authority need not receive an update every time ownership is transferred If the central authority 601 cannot verify the asserted owner the method moves to step 803 where it performs no action, in an embodiment.

In an embodiment, if the central authority 601 is able to verify the asserted owner, the method moves to step 804 where the central authority 601 determines if the signed digital asset 101 is not managed by the distributed ledger.

If at step 804 the central authority 601 determines that the signed digital asset 101 is managed by the distributed ledger, then the central authority 601 may not manage the ownership right of the digital asset (e.g., because doing so may create multiple ownership authorities, introducing a potential for discrepancy in ownership records) . . . . Using the ownership table 700, the central authority 601 may identify the crypto currency blockchain using cryptocurrency column 703, and may perform a lookup on that public blockchain using the contract address stored in column 704 and token ID stored in column 705, which together may identify the asset uniquely on that blockchain. The central authority 601 may verify whether the asset has been burned (e.g., indicating that the blockchain no longer represents an assertion of who the proper owner is, and therefore indicating that it would be appropriate for the central authority 601 to be held out as an entity to manage ownership rights).

If at step 804 the central authority 601 determines that the signed digital asset 101 is managed by the distributed ledger, it moves to step 805 where no action takes place.

If at step 804, the central authority 601 determines that the signed digital asset 101 is not managed by the distributed ledger, the method moves to step 806 where the central authority 601 records the proposed owner of the signed digital asset 101 in a record of the signed digital asset 101 at the central authority 601, the record comprising an asset identification and an owner identification indicating the proposed owner.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any an embodiment may be applied to any other embodiment herein, and flowcharts or examples relating to an embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:

receiving, by processing circuitry at a central authority, a request to record a proposed owner of a signed digital asset at the central authority, the request comprising an asset identification and a proposed owner identification, wherein the signed digital asset is digitally signed using an author's private key and configured for peer-to-peer transfer;

verifying, by the processing circuitry, that an asserted owner is a current owner of the signed digital asset based on data from an ownership record managed by the central authority or a distributed ledger, the ownership record stored in a memory, or based on data from the distributed ledger accessed by the central authority via a network interface;

determining, by the processing circuitry, an indication that the signed digital asset is not managed by the distributed ledger by querying the distributed ledger for an associated non-fungible token (NFT) and verifying that the associated NFT has been burned; and after determining that the signed digital asset is not managed by the distributed ledger and verifying an asserted owner is a current owner of the signed digital asset, recording, by the processing circuitry via a network interface, the proposed owner of the signed digital asset in a record of the signed digital asset at the central authority, the record comprising data indicating an asset identification and an owner identification based on the verified current owner indicating the proposed owner.

2. The method of claim 1 further comprising:

receiving a request to exchange the signed digital asset, the request identifying a seller and a buyer of the signed digital asset;

validating the seller of the signed digital asset by determining that the seller is the current owner of the signed digital asset; and after validating the seller of the signed digital asset, updating the record of the signed digital asset at the central authority to comprise an owner identification indicating the buyer of the signed digital asset.

3. The method of claim 1 wherein the record is a table relating an asset identification to an owner identification and wherein the owner identification is replaced when the signed digital asset is exchanged.

4. The method of claim 1 further comprising:

receiving a request to exchange the signed digital asset for payment;

verifying the payment; and receiving a notification of the exchange.

5. The method of claim 1 further comprising determining a rating associated with the owner identification.

6. The method of claim 5 further comprising:

exchanging the signed digital asset from an asserted owner to a proposed owner;

receiving information about the exchange of the signed digital asset; and assigning or updating the rating associated with the owner identification after receiving information about the exchange of the signed digital asset.

7. The method of claim 1 further comprising:

receiving a request to transfer ownership management of the signed digital asset to the distributed ledger;

executing the request by creating a token on the distributed ledger associated with the signed digital asset; and updating the record to indicate that ownership management of the signed digital asset has been transferred to the distributed ledger.

8. The method of claim 1 further comprising:

in response to updating the record of the signed digital asset at the central authority, automatically transmitting, by the processing circuitry via the network interface, a notification of the updated record of the signed digital asset to a peer-to-peer client associated with the proposed owner.

9. The method of claim 1 further comprising:

receiving a request to verify the ownership of the signed digital asset;

determining the asset identification of the signed digital asset;

using the asset identification, determining information related to the owner of the signed digital asset; and returning the information related to the owner of the signed digital asset.

10. The method of claim 1 wherein the signed digital asset is exchanged in a peer-to-peer transfer.

11. The method of claim 1, wherein verifying that the associated NFT has been burned comprises determining that the associated NFT has been previously transmitted to a burn wallet having no owner and from which the associated NFT is irretrievable.

12. A system comprising:

processing circuitry configured to:

receive, at a central authority, a request to record a proposed owner of a signed digital asset at the central authority, the request comprising an asset identification and a proposed owner identification, wherein the signed digital asset is digitally signed using an author's private key and configured for peer-to-peer transfer;

verify that an asserted owner is a current owner of the signed digital asset based on data from an ownership record managed by the central authority or a distributed ledger, the ownership record stored in a memory, or based on data from the distributed ledger accessed by the central authority via a network interface;

determine an indication that the signed digital asset is not managed by the distributed ledger by the processing circuitry querying the distributed ledger for an associated non-fungible token (NFT) and verifying that the associated NFT has been burned; and after determining that the signed digital asset is not managed by the distributed ledger and verifying an asserted owner is a current owner of the signed digital asset, record the proposed owner of the signed digital asset in a record of the signed digital asset at the central authority, the record comprising data indicating an asset identification and an owner identification based on the verified current owner indicating the proposed owner.

13. The system of claim 12 wherein the processing circuitry is further configured to:

receive a request to exchange the signed digital asset, the request identifying a seller and a buyer of the signed digital asset;

validate the seller of the signed digital asset by determining that the seller is the current owner of the signed digital asset; and after validating the seller of the signed digital asset, update the record of the signed digital asset at the central authority to comprise an owner identification indicating the buyer of the signed digital asset.

14. The system of claim 12 wherein the record is a table relating an asset identification to an owner identification and wherein the owner identification is replaced when the signed digital asset is exchanged.

15. The system of claim 12 wherein the processing circuitry is further configured to:

receive a request to exchange the signed digital asset for payment;

verify the payment; and receive a notification of the exchange.

16. The system of claim 12 wherein the processing circuitry is further configured to determining a rating associated with the owner identification.

17. The system of claim 16 wherein the processing circuitry is further configured to:

exchange the signed digital asset from an asserted owner to a proposed owner;

receive information about the exchange of the signed digital asset; and assign or update the rating associated with the owner identification after receiving information about the exchange of the signed digital asset.

18. The system of claim 12 wherein the processing circuitry is further configured to:

receive a request to transfer ownership management of the signed digital asset to the distributed ledger;

execute the request by creating a token on the distributed ledger associated with the signed digital asset; and update the record to indicate that ownership management of ownership management of the signed digital asset has been transferred to the distributed ledger.

19. The system of claim 12 wherein the processing circuitry is further configured to:

in response to updating the record of the signed digital asset at the central authority, automatically transmit via the network interface, a notification of the updated record of the signed digital asset to a peer-to-peer client associated with the proposed owner.

20. The system of claim 12 wherein the processing circuitry is further configured to:

receive a request to verify the ownership of the signed digital asset;

determine the asset identification of the signed digital asset;

using the asset identification, determine information related to the owner of the signed digital asset; and return the information related to the owner of the signed digital asset.

* * * * *